United States Patent [19]
Schulz, Jr. et al.

[11] Patent Number: 5,622,357
[45] Date of Patent: Apr. 22, 1997

[54] FOUNDATION UNIT AND METHOD OF MAKING THE SAME

[75] Inventors: Martin Schulz, Jr.; David Warner, both of Brenham, Tex.

[73] Assignee: Steadley Company, Carthage, Mo.

[21] Appl. No.: 611,246

[22] Filed: Mar. 5, 1996

[51] Int. Cl.$^6$ ............................... F16F 3/00; A47C 25/00
[52] U.S. Cl. .................... 267/103; 5/247; 5/276
[58] Field of Search ................................ 267/103, 106, 267/107; 5/247, 249, 250, 255, 267, 276, 277

[56] References Cited

U.S. PATENT DOCUMENTS

| | | | |
|---|---|---|---|
| 819,671 | 5/1906 | Pennepacker | 5/276 |
| 3,990,121 | 11/1976 | Whitaker | 5/267 |
| 4,377,279 | 3/1983 | Schulz, Jr. et al. | 267/103 |
| 4,903,949 | 2/1990 | Schulz, Jr. | 267/103 |
| 5,052,064 | 10/1991 | Hagemeister et al. | 5/255 |
| 5,197,155 | 3/1993 | Ogle et al. | 5/255 |
| 5,346,188 | 9/1994 | Rodgers et al. | 267/103 |
| 5,370,374 | 12/1994 | Rodgers et al. | 267/103 |

*Primary Examiner*—Robert J. Oberleitner
*Assistant Examiner*—Chris Schwartz
*Attorney, Agent, or Firm*—Lee, Mann, Smith, McWilliams, Sweeney & Ohlson

[57] ABSTRACT

A foundation unit which can be relaxed in a compact configuration for shipping and which can be then elevated to an expanded state for completion. The foundation unit includes a rectangular grid wire top bearing structure, a rigid bottom substructure, and a series of spaced, parallel intermediate rows of wire supports. The wire supports are oriented in pairs, with the bottom attachment segments of the wire supports being adjacent one another and secured to the bottom substructure. The top attachment segments of the wire supports are spaced from one another such that the wire supports of each pair form a generally V-shaped configuration. The wire supports are sandwiched between spaced longitudinal grid wires of the top bearing structure so that, prior to being secured to the bottom substructure, the wire supports are pivotally secured to the top bearing structures so that the foundation unit can be selectively relaxed for storage or shipping.

16 Claims, 4 Drawing Sheets

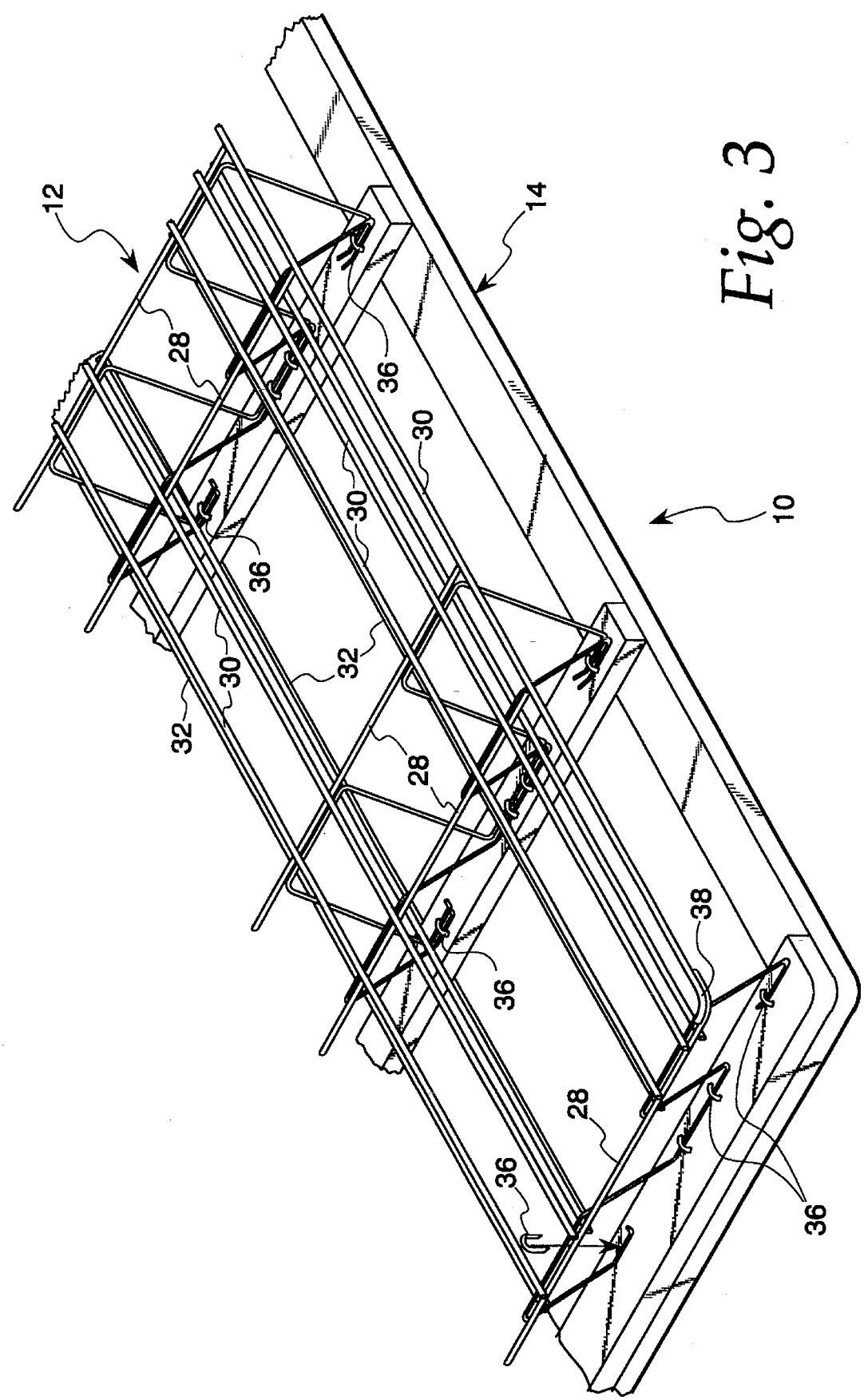

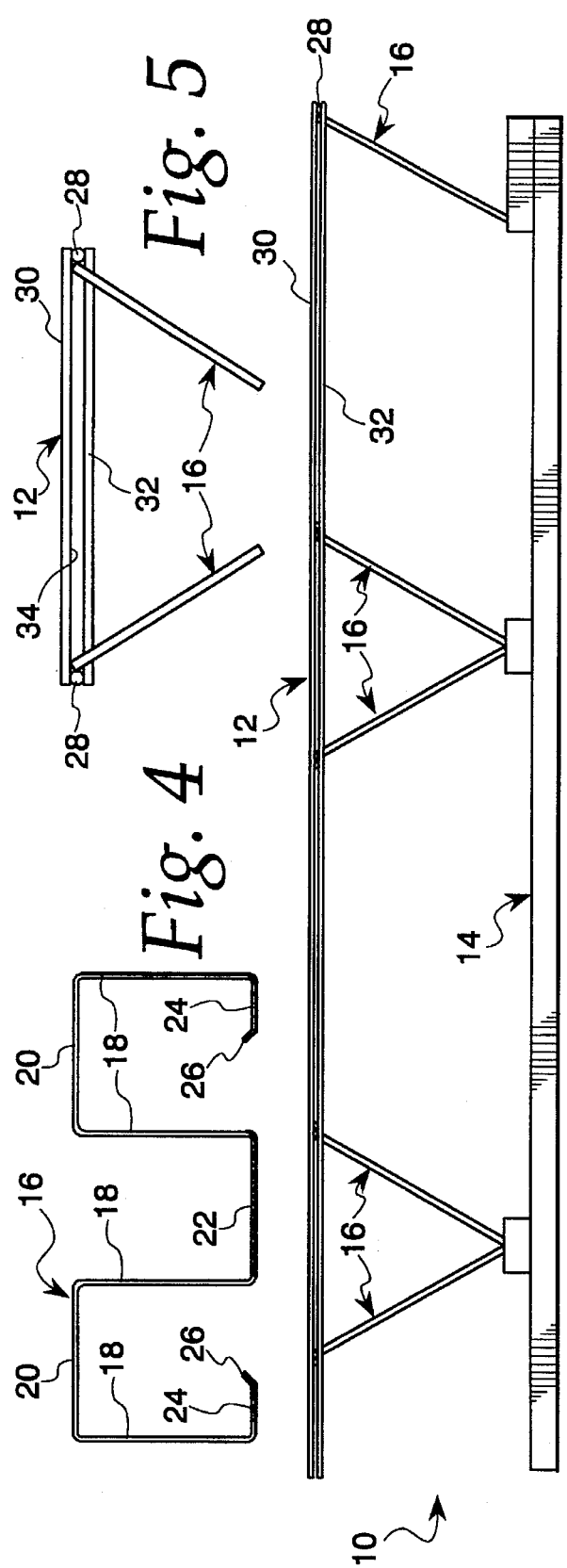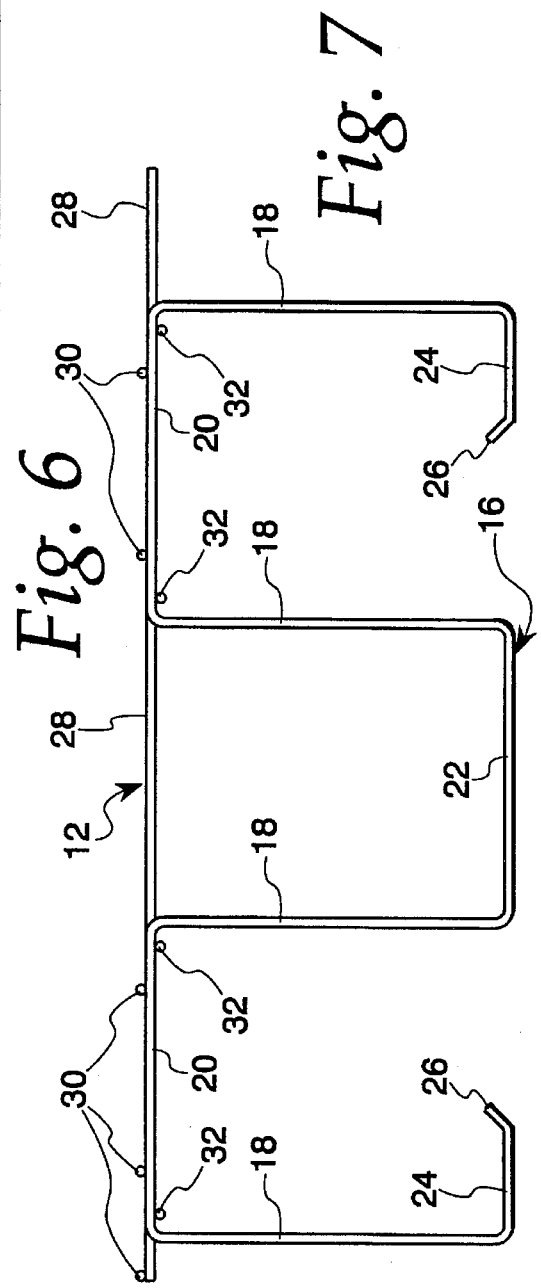

FOUNDATION UNIT AND METHOD OF MAKING THE SAME

BACKGROUND OF THE INVENTION

This invention relates to foundation units, and in particular to a foundation unit which may be fabricated in a factory and then shipped in a relaxed state to be later elevated and completed.

U.S. Pat. No. 4,377,279, assigned to the assignee of this application, pertains to a foldable steel wire foundation unit such as a box spring. The foundation unit is composed of a rigid bottom substructure, a flat top wire grid structure, and a plurality of spaced, parallel rows of substantially flat support members extending between the grid wire top bearing structure and the bottom substructure. Because the support members are substantially flat and are hingedly secured to the grid wire top bearing structure, the foundation unit can be fully assembled at a factory and then shipped to the customer in a relaxed orientation. The customer then raises the unit to a fully expanded orientation and locks the structure in place by a plurality of oppositely-directed struts. The foundation unit is then padded and covered with fabric in a conventional fashion.

U.S. Pat. No. 4,770,379, also assigned to the assignee of the present application, is an improvement over the structure of the '279 patent. The '379 patent is directed to a different type of wire support member for a foundation unit, in that the wire supports comprise oppositely oriented sinuous wire segments. The wire segments provide some resiliency, and similar to the '279 patent, the foundation unit is capable of being relaxed for shipping and later expanded for completion and ultimate use.

U.S. Pat. No. 4,903,947, also assigned to the assignee of the present application, is a further improvement over the foundation units disclosed in the '279 and '397 patents. This patent employs a series of sinuous wire elements which are secured to the top bearing structure in such a way that the foundation unit can also be relaxed for shipping. Auxiliary stabilizers such as struts are unnecessary to retain the foundation unit in an expanded orientation.

While the structures of U.S. Pat. Nos. 4,377,279; 4,770,397 and 4,903,949, the disclosures of which are incorporated herein by reference, provide quite adequate foundation units, they do suffer some deficiencies. In all instances, the intermediate wire supports must be clipped in some manner to the flat grid wire top bearing structure. Use of individual clips is costly. In addition, some of the structures cannot remain standing without use of struts, an additional expense in both fabrication and ultimate formation of the foundation unit. In addition, the foundation units require the typical nine rows of supports, one row at either end and seven intermediate rows.

SUMMARY OF THE INVENTION

The invention provides a foundation unit which has a flat grid wire top bearing structure, and which is of determined depth and generally rectangular in shape, with the foundation unit further having a bottom substructure and support means intermediate the top bearing structure and the bottom substructure for maintaining the determined depth. In accordance with the invention, it includes the support means comprising a plurality of parallel rows of support members located between opposite lateral side edges of the top bearing structure. Each of the rows of support members is composed of at least one generally flat wire support, each wire support having a top attachment segment and a bottom attachment segment. Selected rows of the wire support members are arranged in pairs, with the bottom attachments segments of the wire supports of each pair being located substantially adjacent one another and the top attachment segments of the wire supports of each pair being spaced from one another such that the wire supports of each pair form a generally V-shaped configuration.

The grid wire top bearing structure comprises a plurality of spaced longitudinal grid wires and a plurality of spaced lateral grid wires. The longitudinal grid wires are oriented to form a series of attachments spaces. The top attachment segments of the support members are pivotally secured in respective ones of the attachment spaces such that the foundation unit can be selectively relaxed.

In accordance with the preferred form of the invention, a first portion of the longitudinal grid wires is located in a first plane and second portion of the longitudinal grid wires is located in a second plane. The planes are spaced from and parallel to one another to form the attachment spaces. The lateral grid wires are located between the two planes, and determine spacing of the planes.

The grid wires are secured to one another in any manner. In the preferred version of the invention, the grid wires are welded to one another when the foundation unit is formed.

Each attachment space is located between adjacent lateral grid wires. Therefore, each pair of wire supports has its top attachment segment located between and abutting one of the lateral grid wires on opposite sides of the attachment space.

It is preferred that each wire support is crenelated. The bottom attachment segment of each of the wire supports comprises a horizontal portion of each support member in the form of legs extending from the support member.

The foundation unit of the invention is formed by the steps of first partially forming the grid wire top bearing structure with a first plurality of the spaced longitudinal grid wires secured to one side of the spaced lateral grid wires. The first plurality of longitudinal grid wires lie essentially in a plane. A bottom substructure is provided, generally coextensive with the top bearing structure. The generally flat support members are then provided in the spaced rows, with the top bearing structure of each of the top attachment segments being adjacent the first longitudinal grid wires, and with selected rows of the support members being arranged in pairs between selected pairs of the lateral grid wires. The support members are then secured to the top bearing structure by affixing a second plurality of longitudinal grid wires to the lateral grid wires such that the top attachment segments are sandwiched between selected ones of the first plurality of longitudinal grid wires and the second plurality of longitudinal grid wires. To complete the foundation unit, the top bearing structure is located in spaced relation to the bottom substructure with the support members in the generally V-shaped configuration with their bottom attachment segments adjacent one another, and the bottom attachment segments are then secured to the bottom substructure. The foundation unit can then be completed by adding padding and a fabric cover, in a conventional fashion.

In formation of the top bearing structure, in accordance with the method of the invention, the grid wires are welded to one another for strength, rigidity and elimination of noise. The V-shaped configurations of the support members are stapled to the bottom substructure when the foundation unit is assembled.

BRIEF DESCRIPTION OF THE DRAWINGS

The invention is described in greater detail in the following description of an example embodying the best mode of the invention, taken in conjunction with the drawing figures, in which:

FIG. 3 is an enlarged partial perspective view of one corner of the foundation unit, when assembled, FIG. 4 is an elevational view of one of the support members according to the invention, FIG. 5 is a partial side elevational view showing two rows of support members, with the support members forming a generally V-shaped configuration, FIG. 6 is a side elevational view of approximately one half of the foundation unit according to the invention, and FIG. 7 is an enlarged elevational and cross-sectional view showing one of the support members when installed in the grid wire top bearing structure, with the bottom substructure omitted.

DESCRIPTION OF AN EXAMPLE EMBODYING THE BEST MODE OF THE INVENTION

Figure 1:
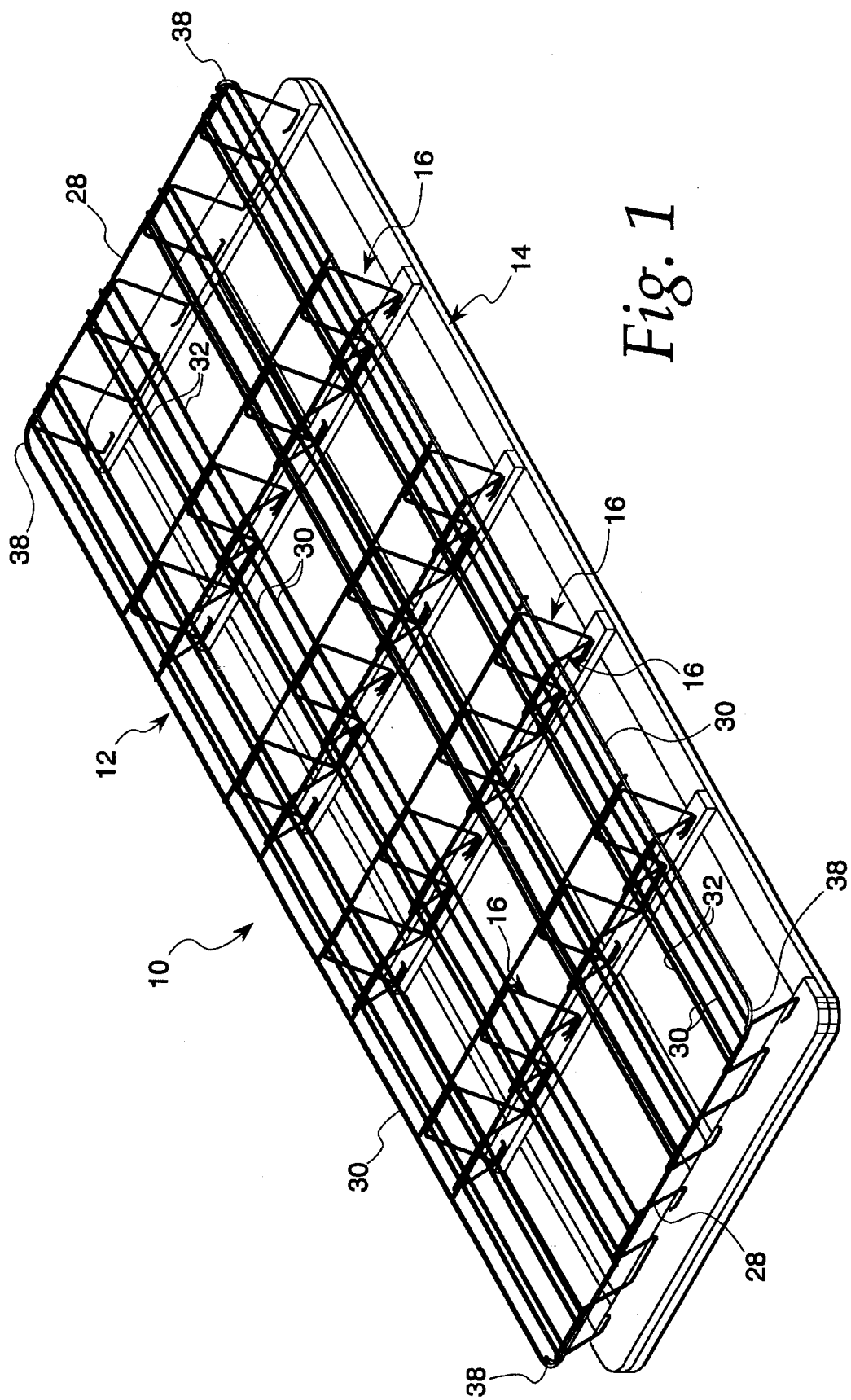
FIG. 1 is perspective view of a foundation unit according to the invention.

A foundation unit according to the invention is shown generally at 10 in the drawing figures. It will be understood by one skilled in the art that the foundation unit 10 illustrated has been shown without top padding and the surrounding fabric, those being conventional elements that can be applied to the foundation unit in a conventional fashion, and which are therefore not illustrated.

The foundation unit 10 according to the invention is composed of a rectangular, grid wire top bearing structure 12, a rigid bottom sub structure 14, such as a wooden frame, and a series of spaced rows of support members 16 extending substantially between opposite side edges of the foundation unit 10.

Each of the support members 16 is preferably a wire support formed in a crenelated fashion. As best illustrated in FIGS. 4 and 17, each of the wire support members 16 is composed of a single length of wire, bent to form a series of upstanding legs 18 with connecting top attachment segments 20 and a central bottom attachment segment 22. Also included are further bottom attachment segments 24 which form the opposite ends of the wire element composing the support members 16. Each of the attachment segments 24 includes an upturned tip 26 which serves, when the segments 24 are stapled to the bottom substructure 14, to assure that the support member 16 is properly oriented in place.

The number of support members 16 employed in each row will depend on the width of the foundation unit 10 and the widths of the support members 16. A single bed width is shown, having two support members 16 in each row. A wider unit would employ more support members 16 or wider support members, or both.

The top bearing structure 12 is composed of a series of spaced, lateral grid wires 28 and two sets of spaced, longitudinal grid wires 30 and 32. As illustrated, the longitudinal grid wires 30 lie in one plane, while the longitudinal grid wires 32 lie in a separate plane, spaced from the first plane by the thickness of the lateral grid wires 28. The lateral grid wires 28 and longitudinal grid wires 30 and 32 are suitably affixed to one another, such as by welding. Thus, as shown in the drawing figures, the separation of the longitudinal grid wires 30 and 32 forms a series of attachment spaces 34 for pivotally securing the support members 16.

The support members 16 on opposite ends of the foundation unit 10 are oriented at opposite angles as shown. They have their top attachment segments 20 bearing against lateral grid wires 28 on opposite ends of the foundation unit 10 and have their bottom attachment segments 22 and 24 stapled to the bottom substructure 14 by means of a series of staples 36.

Figure 2:
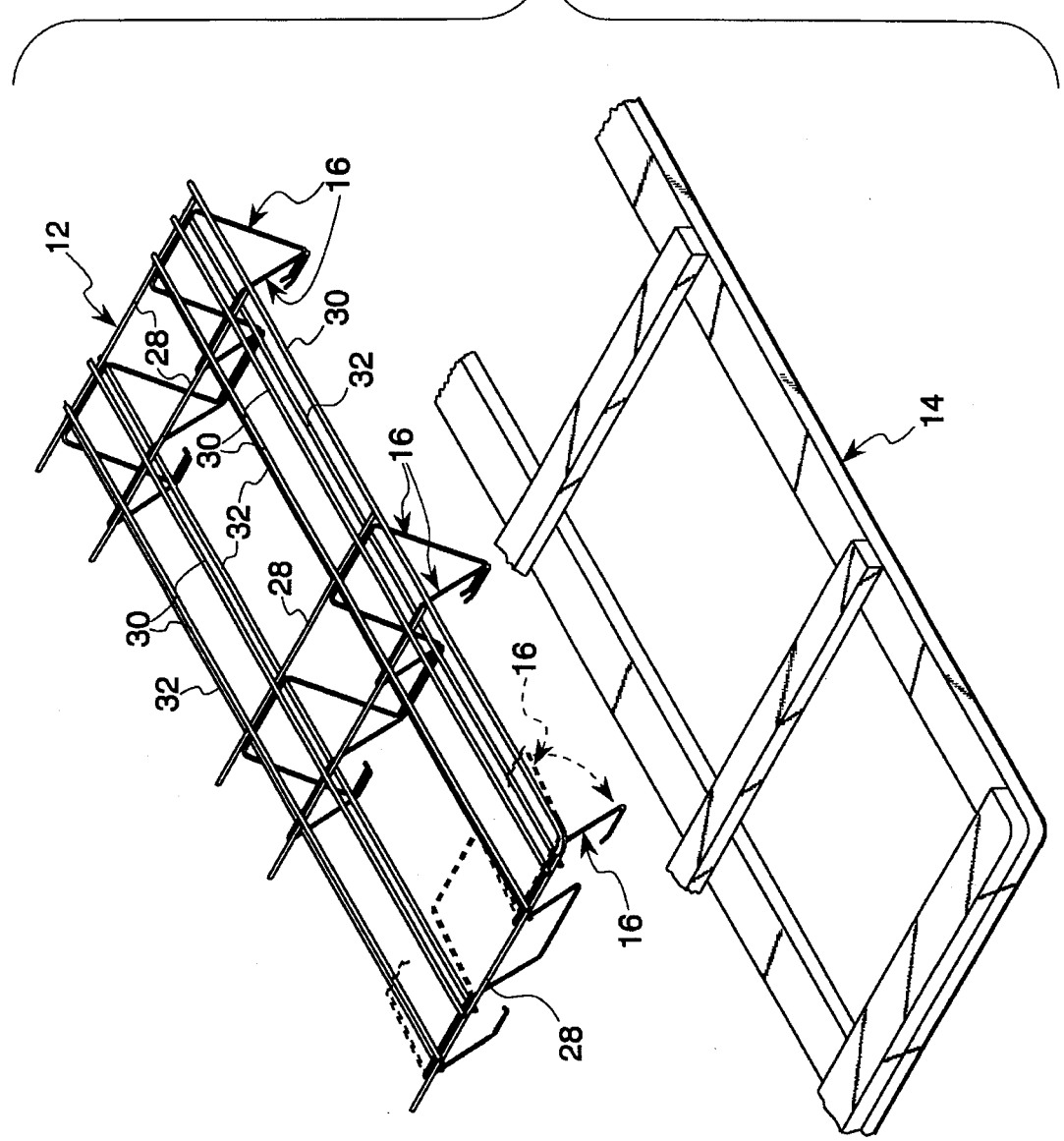
FIG. 2 is an enlarged, exploded perspective view of a portion of the foundation unit according to the invention, showing the separation between the grid wire top bearing structure and the bottom substructure for shipping, and illustrating pivoting of the support members for that purpose.

The support members 16 between the opposite ends of the foundation unit 10 are situated in pairs. As best illustrated in FIG. 3, the bottom attachment segments 22 and 24 of each of the pairs of support members 16 are stapled to the bottom substructure 14, while the top attachment segments 20 are spaced and abut opposite lateral grid wires 28. The top attachment segments are sandwiched between the longitudinal grid wires 30 and 32 and, as shown in FIG. 2, are pivotal until being secured to the bottom substructure 14.

The foundation unit 10 does not employ a conventional border wire. Instead, and as best illustrated in FIGS. 1 and 3, an outer longitudinal grid wire 30 forms the outer border on both sides of the foundation unit, while end lateral grid wires 28 form the end borders for the foundation unit 10. Where the outer longitudinal grid wires 30 and lateral grid wires 28 intersect, their ends are curved to form a curved corner 38. The overlap between the lateral grid wires 28 and longitudinal grid wires 30 at the curved corners 38 can be welded or the grid wires can otherwise be secured to one another.

The foundation unit 12 is formed in a series of assembly steps. First, a series of the support members 16 are fabricated, as well as a bottom substructure 14. The bottom substructure 14 can be a conventional wood base, and is therefore not described in greater detail. The grid wire top bearing structure is partially formed by welding the lateral grid wires 28 to either the longitudinal grid wires 30 or the longitudinal grid wires 32. Then, the support members are installed, as shown in FIG. 2, and the remaining longitudinal grid wires 32 (or 30, depending on which was first welded to the lateral grid wires 28) are welded in place, pivotally securing the support members 16 in the attachment spaces 34. If the completion of the foundation unit 10 is desired at this point, the support members 16 are angled as shown in drawing figures, and then stapled by the staples 36 to the bottom substructure 14. If, on the other hand, it is desired to first ship the foundation unit before its completion, the support members 16 are rotated flat against the underside of the top bearing structure 12, as shown in phantom FIG. 2. The top bearing structure 12 can then be lain atop the bottom substructure 14, and shipped in that relaxed orientation. After shipment, the final assembly, as just explained, can then take place. Thereafter, as is conventional, padding and a fabric cover are applied to the foundation unit in a conventional fashion.

ACHIEVEMENTS

Several advantages are achieved by the invention over the prior art. First, because the invention is formed without the use of conventional clips or other kinds of metal-to-metal fasteners, the foundation unit can be formed by an automated process, and therefore the cost of the invention is considerably less than earlier foundation units. Second, because the support members 16 are angled toward one another, rather than standing fully upright, depending on the thickness and nature of the wire forming the support members 16, the foundation unit 10 will have some resiliency.

Because of the use of two sets of longitudinal grid wires 30 and 32, the top bearing structure 12 is far more rigid than a grid wire top bearing structure having only a single series of intersecting longitudinal and lateral grid wires. As a result, fewer of the intervening V-shaped configurations of the support members 16 are needed. As illustrated in FIG. 1, instead of the conventional seven rows of support members, only four rows are necessary. This, therefore, reduces the cost of fabrication, as well as the material cost for the foundation unit 10.

Because a separate border wire is not utilized, the number of parts and therefore the complexity of the foundation unit 10 are reduced. No stabilizers or other means of retaining the foundation unit 10 are required. With the support members 16 forming a V-shaped configuration, the foundation unit 10 is extremely stable and rigid.

Because the foundation unit 10 can be shipped in a relaxed orientation, shipping costs are reduced over those for a foundation unit which must be shipped in a fully assembled and upright orientation. Final assembly time is reduced, and therefore the resulting cost is also reduced because fewer rows of support members 16 are required.

Various changes can be made to the invention without departing from the spirit thereof or scope of the following claims.

What is claimed is:

1. In a foundation unit having a flat grid top bearing structure, the foundation unit being of determined depth and generally rectangular in shape, the foundation unit further having a bottom substructure and support means intermediate the top bearing structure and the bottom substructure for maintaining the determined depth, the improvement comprising
    a. said support means comprising a plurality of parallel rows of support members located between opposite lateral side edges of the top bearing structure, each of said rows of support members being composed of at least one generally flat wire support, each wire support having a top attachment segment and a bottom attachment segment,
    b. selected rows of said support members being arranged in pairs, with the bottom attachment segments of the wire support of each pair being located substantially adjacent one another and the top attachment segments of the wire supports of each pair being spaced from one another such that the wire supports of each pair form a generally V-shaped configuration, and
    c. said grid wire top bearing structure comprising a plurality of spaced longitudinal grid wires and a plurality of spaced lateral grid wires, said longitudinal grid wires being oriented in two vertically spaced planes to form a series of attachment spaces, said top attachment segments being pivotally secured in respective ones of said attachment spaces such that said foundation unit can be selectively relaxed.

2. A foundation unit according to claim 1 in which a first portion of said longitudinal grid wires is located in a first of said planes and a second portion of said longitudinal grid wires is located in a second of said planes, said planes being parallel to one another.

3. A foundation unit according to claim 2 in which said lateral grid wires are located between said planes and determine the spacing of said planes, and said grid wires are secured to one another.

4. A foundation unit according to claim 3 in which said grid wires are welded to one another.

5. A foundation unit according to claim 3 in which said attachment spaces are located between an adjacent pair of lateral grid wires.

6. A foundation unit according to claim 1 in which each said wire support is crenelated.

7. A foundation unit according to claim 1 in which each bottom attachment segment includes a horizontal portion of each support member.

8. A foundation unit comprising
    a. a grid wire top bearing structure comprising a plurality of spaced longitudinal grid wires and a plurality of spaced lateral grid wires, a first portion of said longitudinal grid wires being secured to one side of said lateral grid wires and a second portion of said longitudinal grid wires being secured to an opposite side of said lateral grid wires,
    b. a bottom substructure spaced from said top bearing structure,
    c. support means intermediate said top bearing structure and said bottom substructure, said support means comprising a plurality of parallel rows of support members extending between said top bearing structure and said bottom substructure, each of said rows of support members being composed of at least one generally flat intermediate support, each intermediate support having a top attachment segment and a bottom attachment segment, and
    d. selected rows of said support members being arranged in pairs, with the bottom attachment segments of the intermediate supports of each pair being located adjacent one another and secured to the bottom substructure, and the top attachment segments of the intermediate supports of each pair being spaced from one another between a pair of said lateral grid wires with each top attachment segment abutting a lateral grid wire and being located between said first and second portions of said longitudinal grid wires, such that the intermediate supports of each pair form a generally V-shaped configuration.

9. A foundation unit according to claim 8 in which each intermediate support comprises a crenelated wire.

10. A foundation unit according to claim 8 in which said grid wires are welded to one another.

11. A foundation unit according to claim 8 in which the adjacent bottom attachment segments of each V-shaped configuration are stapled to said bottom substructure.

12. A method of forming a foundation unit, comprising the steps of
    a. forming a grid wire top bearing structure comprising a first plurality of spaced longitudinal grid wires and a plurality of spaced lateral grid wires, said first longitudinal grid wires lying essentially in a plane and being secured to one side of said lateral grid wires,
    b. providing a bottom substructure generally coextrusive with said top bearing structure,
    c. providing a series of generally flat support members, each support member having a top attachment segment and a bottom attachment segment,
    d. locating said support members in a plurality of spaced rows in said top bearing structure with said top attachment segments being adjacent said first longitudinal grid wires, and with selected rows of said support members being arranged in pairs between selected pairs of said lateral grid wires, and e. securing said support members to said top bearing structure by affixing a second plurality of longitudinal grid wires to a second side of said lateral grid wires such that said top attachment segments are sandwiched between selected ones of said first plurality of longitudinal grid wires and said second plurality of longitudinal grid wires.

13. A method according to claim 12, including the further steps of f. locating the top bearing structure in spaced relation to said bottom substructure by arranging the pairs of said support members in generally V-shaped configurations with their bottom attachment segments adjacent one another, and g. securing the adjacent bottom attachment segments to the bottom substructure.

14. A method according to claim 13 in which method step "g" includes stapling said bottom attachment segments to the bottom substructure.

15. A method according to claim 12, in which step "a" includes welding the first longitudinal grid wires to the lateral grid wires.

16. A method according to claim 12, in which method step "e" includes welding the second longitudinal grid wires to the lateral grid wires.

\* \* \* \* \*